US007429404B2

(12) United States Patent
Ernst et al.

(10) Patent No.: US 7,429,404 B2
(45) Date of Patent: Sep. 30, 2008

(54) METHODS OF SELECTIVELY INCORPORATING METALS ONTO SUBSTRATES

(75) Inventors: Richard D. Ernst, Salt Lake City, UT (US); Edward M. Eyring, Salt Lake City, UT (US); Gregory C. Turpin, Salt Lake City, UT (US); Brian C. Dunn, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 326 days.

(21) Appl. No.: 11/215,828

(22) Filed: Aug. 29, 2005

(65) Prior Publication Data

US 2006/0057400 A1 Mar. 16, 2006

Related U.S. Application Data

(63) Continuation-in-part of application No. 11/195,587, filed on Aug. 1, 2005, now abandoned.

(60) Provisional application No. 60/592,631, filed on Jul. 30, 2004.

(51) Int. Cl.
*C23C 16/40* (2006.01)

(52) U.S. Cl. ........................... 427/255.26; 427/255.31; 427/255.32

(58) Field of Classification Search ............ 427/255.31, 427/255.32, 255.26
See application file for complete search history.

(56) References Cited

U.S. PATENT DOCUMENTS

| | | | | |
|---|---|---|---|---|
| 5,077,085 | A * | 12/1991 | Schnur et al. | 438/669 |
| 6,159,855 | A * | 12/2000 | Vaartstra | 438/681 |
| 6,307,116 | B1 | 10/2001 | Heinrichs et al. | |
| 6,353,035 | B2 | 3/2002 | Manzer et al. | |
| 6,355,219 | B2 | 3/2002 | Suh et al. | |
| 6,361,757 | B1 | 3/2002 | Shikada et al. | |
| 6,365,544 | B2 | 4/2002 | Herron et al. | |
| 6,376,421 | B2 | 4/2002 | Sun et al. | |
| 6,586,538 | B2 | 7/2003 | Ford et al. | |
| 6,676,816 | B2 * | 1/2004 | Mao et al. | 204/403.14 |
| 6,686,306 | B2 | 2/2004 | Shih | |
| 6,733,828 | B2 * | 5/2004 | Chao et al. | 427/239 |
| 2003/0224927 | A1 | 12/2003 | Shih | |

FOREIGN PATENT DOCUMENTS

WO WO/03/065536 * 8/2003

OTHER PUBLICATIONS

Strelets, V.V., "Electrochemical Activation of Metal Complexes: Redox-Initiated Haptotropic Isomerization of Organometallic ?-Complexes." Theoretical and Experimental Chemistry, vol. 32, No. 2, 1996, pp. 57-66.*

Robbins, Michael H., et al., "Redox Considerations for a Ruthenium Complex Catalysis of Substrate Oxidation by Hydrogen Peroxide in Aqueous Solution". J. Chem. Soc., Dalton Trans., 1996, pp. 105-110.*

Lin, Andrew S., et al., "Oxygen reduction on Nafion-bound unpyrolyzed metal macrocyclic complexex." Journal of Electroanalytical Chemistry, vol. 541 (Jan. 16, 2003) pp. 147-151.*

Bell, A.T., "The Impact of Nanoscience on Heterogeneous Catalysis," *Science* 2003, 299, pp. 1688-1691.

Davis, B.H., "Fischer-Tropsch synthesis: current mechanism and futuristic needs," *Fuel Proc. Tech,* 2001, 71, pp. 157-166.

Dry, M.E., "Practical and theoretical aspects of the catalytic Fischer-Tropsch process," *App. Catal. A: General,* 1996, 138, pp. 319-344.

Dunn, B.C. et al., "Silica aerogel supported catalysts for Fischer-Tropsch synthesis,"0 App. Catal. A: General, 2005, 278, pp. 233-238.

Dunn, B.C. et al., "Silica aerogel supported cobalt metal Fischer-Tropsch catalysts for syngas to diesel range fuel conversion" *Energy & Fuels,* 2004, 18, pp. 1519-1521.

Elschenbroich, Ch. et al., ""Closed", "Half-Open", and "Open" Ferrocenes: Redox Behavior and Electron Spin Resonance of the Radical Cations"," *Organometallics,* 1985, 4, pp. 2068-2071.

Ernst, R.D., "Pentadienyl Ligands: Their Properties, Potential, and Contributions to Inorganic and Organometallic Chemistry," *Comments Inorg. Chem.,* 1999, 21, pp. 285-325.

Gosser, L.W. et al, Chapter 32: "π-Cyclooctenyl-π -1,5-Cyclooctadienecobalt," *Inorg. Syn.,* 1977, 17, pp. 112-115.

Hendrickson, D.N. et al., "Magnetic Susceptibility Study of Various Ferricenium and Iron (III) Dicarbolide Compounds," *Inorg. Chem.,* 1971, 10, pp. 1559-1563.

Husing, N. et al., "Aerogels—Airy Materials: Chemistry, Structure, and Properties," *Angew. Chem. Int. Ed.,* 1998, 37, pp. 23-45.

Jacobs, G. et al., "Fischer-Tropsch synthesis: support, loading, and promoter effects on the reducibility of cobalt catalysts," *App. Catal. A: General,* 2002, 233, pp. 263-281.

Ma, Z. et al. "Solid state NMR investigation of Fischer-Tropsch catalysts", 45th Experimental Nuclear Magnetic Resonance Conference (ENC), Apr. 18-23, 2004, Pacific Grove, CA, pp. 82-84.

Mori, K. et al., "Hydroxyapatite-Bound Cationic Ruthenium Complexes as Novel Heterogeneous Lewis Acid Catalysts for Diels-Alder and Aldol Reactions," *J. Am. Chem. Soc.,* 2003, 125, pp. 11460-11461.

Nozaki, C. et al., "Synthesis, Characterization, and Catalytic Performance of Single-Site Iron (III) Centers on the Surface of SBA-15 Silica," *J. Am Chem. Soc.* 2002, 124, pp. 13194-13203.

(Continued)

*Primary Examiner*—Bret Chen
(74) *Attorney, Agent, or Firm*—Thorpe North & Western LLP

(57) ABSTRACT

A method for forming multi-metallic sites on a substrate is disclosed and described. A substrate including active groups such as hydroxyl can be reacted with a pretarget metal complex. The target metal attached to the active group can then be reacted with a secondary metal complex such that an oxidation-reduction (redox) reaction occurs to form a multi-metallic species. The substrate can be a highly porous material such as aerogels, xerogels, zeolites, and similar materials. Additional metal complexes can be reacted to increase catalyst loading or control co-catalyst content. The resulting compounds can be oxidized to form oxides or reduced to form metals in the ground state which are suitable for practical use.

29 Claims, No Drawings

OTHER PUBLICATIONS

Otsuka, S. et al., "Synthesis, Structure, and Properties of π-Cyclo-octenyl-π-cyclo-octa-1,5-dienecobalt," *Chem. Soc. A.,* 1968, pp. 2630-2633.
Ryan, J.V. et al., "Electronic connection to the interior of a mesoporous insulator with nanowires of crystalline $RuO_2$," *Nature,* 2000, 406, pp. 169-172.
Schulz, H., "Short history and present trends of Fischer-Tropsch synthesis," *App. Catal. A: General,* 1999, 186, pp. 3-12.
Wilson, D.R. et al., "BIS (2, 4-Dimethylpentadienyl) complexes of the Transition Metals" *Organomet. Synth.* 1986, 3, pp. 136-141.

* cited by examiner

METHODS OF SELECTIVELY INCORPORATING METALS ONTO SUBSTRATES

RELATED APPLICATIONS

The present application is a continuation-in-part of U.S. patent application Ser. No. 11/195,587, which was filed Aug. 1, 2005 now abandoned and which claims the benefit of U.S. Provisional Application No. 60/592,631, filed on Jul. 30, 2004, each of which is incorporated herein by reference in their entirety.

GOVERNMENT INTEREST

This invention was made with government support under grant #DE-FC26-05NT42456, awarded by the Department of Energy. The Government has certain rights to this invention.

FIELD OF THE INVENTION

The present invention relates generally to depositing materials on a surface. More particularly, the present invention relates to targeted deposition of metals on a substrate. Accordingly, the present invention involves the fields of chemistry, metallurgy, catalysis, and materials science.

BACKGROUND OF THE INVENTION

Deposition of various materials on surfaces can facilitate achievement of a wide variety of goals such as improving mechanical wear, corrosion resistance, chemical reactivity, catalytic value, and a number of other beneficial properties. More specifically, many metals and metal species can be used as catalytic agents. Of significant commercial interest are processes for the synthesis of hydrocarbons from common sources. The Fischer-Tropsch (F-T) synthesis of hydrocarbons from syn gas (predominantly CO and $H_2$) mixtures is a process of great economic importance, particularly overseas. Given the uncertainties in future oil supplies, the F-T process may well assume greater global importance. From the vast amount of work in this area, it is well recognized that the most active catalysts incorporate iron, cobalt, and ruthenium on oxide supports. Unfortunately, many current catalyst materials are often expensive, have limited useful life, and/or have limited catalyst loading and yields.

In addition, conventional catalyst preparation on various supports involves precipitation of metal compounds. More specifically, a carrier or support material can be optionally evacuated and then contacted with an impregnating solution. Excess solution is removed and the carrier is dried and then calcined, i.e. decomposed to form a metal oxide. Often the calcined product is then activated at a later time such as in situ immediately prior to use. Most often these methods produce randomly distributed metal oxides or metals and can suffer from non-selective deposition across the support surface. As a result, catalyst metals tend to associate with one another merely by proximity or by chance. This is especially problematic in multi-metallic catalysts where improved catalytic activity is the result of the combined synergistic effects of each of the constituent co-catalysts. In such products, conventional random deposition techniques result in reduced catalytic activity than might theoretically be expected from the combination of certain co-catalysts. Therefore, materials and methods which provide improved catalytic effects would be useful in this and other areas of technology which involve deposition of metals or other materials on a surface.

SUMMARY OF THE INVENTION

It has been recognized that it would be advantageous to develop a method to facilitate deposition of materials on a substrate. In one aspect, the present invention provides a method of incorporating metals on a substrate. A pretarget metal complex can be reacted with an active group on a substrate to form a target metal species. The target metal species can be optionally oxidized or reduced to form a target metal species on the substrate. For example, an oxidized target metal is therefore in a higher oxidation state sufficient that it can be targeted by a secondary metal complex acting as a reducing agent which reacts with the oxidized target metal in an oxidation-reduction reaction to form a multi-metallic compound on the substrate. The multi-metallic compound can then be oxidized to form the respective metal oxide of the second metal. This supported multi-metallic metal oxide can be used "as is" or further treated to activate the catalyst as a metallic metal in the ground state.

In one detailed aspect of the present invention, the substrate can be a highly porous material such as aerogel, xerogel, zeolite, silica, alumina, silica gel, or other similarly porous materials. Currently, aerogels are preferred for a wide variety of applications and can provide exceptionally high surface area, pore volume, and can facilitate reclamation of precious catalyst materials.

In another detailed aspect of the present invention, at least one of the pretarget metal complex and the secondary metal complex can be a metal dienyl complex, ferrocene, cobaltocene, ruthenocene, cerium alkoxide, or the like. Catalytically active metals can be complexed with a wide variety of ligands such as, but not limited to, 2,4-dimethylpentadienyl, aromatic cyclopentadienyl, aromatic pentamethylcyclopentadienyl, cyclooctenyl, cyclooctadiene, cyclooctadienyl, hexamethylbenzene, acetate, acetyl acetonate (acac), halides, nitrogen bound species, heteroatom species, other ligands commonly used in coordination complexes, and the like.

The targeting and optional oxidation or reduction steps using treatment with selected metal complexes can be repeated in order to achieve a desired loading of each co-catalyst metal and to control the ratio between co-catalysts. This can help to increase control of cost and performance of the final product.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION

Reference will now be made to exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

It must be noted that, as used in this specification and the appended claims, the singular forms "a," "an," and "the" include plural referents unless the context clearly dictates otherwise. Thus, for example, reference to "an additional metal-containing species" includes one or more of such species, reference to "a substrate" includes reference to one or more of such materials, and reference to "an oxidizing step" includes reference to one or more of such steps.

Definitions

In describing and claiming the present invention, the following terminology will be used in accordance with the definitions set forth below.

As used herein, "incorporating" of metals refers to association of a metal with a material. Incorporation of metals can include a wide variety of associations such as, but not limited to, covalent bonds, ionic bonds, hydrogen bonding, other electrostatic attractions, intimate mechanical bonding, or the like. Typical configurations can result in covalent bonds, ionic bonds, and/or mechanical bonding; however the present invention is not so limited.

As used herein, "reacting" refers to any interaction between the identified materials which results in an association of the identified materials. A reaction of materials can result in formation and/or destruction of chemical bonds, ionic association, or the like.

As used herein, "multi-metallic compound" refers to a material including more than one type of metal. Multi-metallic compounds can include complex metal salts, alloys, mixed metal domains, or other species including a plurality of metals. Typically, the multi-metallic compound can include metals which are complex metal salts. However, metals which are in various oxidation states can also be suitable for some applications, e.g., prior to activation of a catalyst or oxidation.

As used herein, "metal complex" refers to any metal-containing species where at least one metal atom is associated with a compound via interatomic forces, e.g., van der Waals, ionic bonding, covalent bonding, etc. Metal complexes can include metal complexes such as metallocenes, metal chelates, or other metal coordination complexes.

As used herein, "pretarget" refers to a complex or compound prior to association with a substrate. A species becomes a target once it is associated with a substrate. In this way, specific metal-containing species can be prepared as targets for other metal species in the manner described herein.

As used herein with respect to an identified property or circumstance, "substantially" refers to a degree of deviation that is sufficient so as to measurably detract from the identified property or circumstance. The exact degree of deviation allowable may in some cases depend on the specific context. Thus, for example, removal of "substantially all" of a material leaves either no or only trace amounts of the material. Most often, one or more elements will be completely absent from the composition of interest, rather than a mere change in compositional percentages. Similarly, a "substantially enhanced" property has a statistically significant deviation, e.g., as in catalytic activity.

As used herein, a plurality of items, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As a non-limiting example of this principle, although aerogels and silica gels are listed as substrates each has unique properties which may make it more or less suitable in a given circumstance, e.g. aerogels have very different considerations in manufacture and use which make these two substrates significantly different in many applications. It is not the purpose of this specification to exhaustively outline every possible distinction among potentially useful components, but rather to illustrate the principles of the present invention, often with the use of such lists.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 10 to about 50" should be interpreted to include not only the explicitly recited values of about 10 to about 50, but also include individual values and sub-ranges within the indicated range. Thus, included in this numerical range are individual values such as 20, 30, and 40 and sub-ranges such as from 10-30, from 20-40, and from 30-50, etc. This same principle applies to ranges reciting only one numerical value. Furthermore, such an interpretation should apply regardless of the breadth of the range or the characteristics being described.

Invention

In accordance with the present invention metals can be incorporated on a substrate using redox reactions between two metal-containing species. The two metal-containing species can be coordination or organometallic complexes of metals which are catalytically active in the ground state and/or as an oxide. Each of the metal-containing species can be selectively deposited such that control of concentrations and placement of second or additional metal atoms can be significantly improved.

Substrate

The present invention can be used in connection with almost any catalyst support material or substrate. Conventional supports can be used and, depending on the specific application, the substrate can be formed of almost any material which has, or can be modified to have, an active group on the surface thereof. The active group can be any group which can be used as a point of attachment for a metal complex. The active group can typically be hydroxyl, although any group such as, but not limited to, species which can serve as ligands (e.g., electron pair donors) to metal centers, whether by direct attachment or through substitution, e.g., of a proton can also be used.

Additionally, the substrate can be a porous or non-porous material. Materials which can be used to form substrates suitable for use with present invention can include, but are not limited to, polymers, ceramics, metals, nanotubes, semiconductors, or any solid phase upon which a metal or metal-containing species can be supported or attached. Additionally, the substrate can comprise a metal carbide or a metal boride.

In one specific aspect, the substrate can be a porous material such as those suitable for use as catalyst supports. For example, the substrate can comprise a member selected from the group consisting of aerogel, xerogel, zeolite, silica, alumina, aluminum phosphates, silica gels, and composites or combinations thereof. Examples of currently preferred porous substrate materials include aerogels, xerogels, zeolites, and combinations or composites thereof. However, it will be understood that the present invention can also be used in connection with other porous materials or other conventional catalyst support materials.

Because of their unique properties, aerogels can be particularly useful for production of catalytic materials using the methods of the present invention. A wide variety of aerogels can be used in the present invention such as, but not limited to, those based on silica, alumina, titania, tungsten oxide, iron oxide, tin oxide, nickel tartarate, cellulose, polymers, or the like. In one aspect, the aerogels can be silica, alumina, or titania aerogels. A non-limiting example of potential applications of this approach can include using highly porous materials as the substrate. For example, aerogels such as silica aerogels, whose high surface areas and large pore sizes can offer substantial advantages. Materials having a variety of porosity and surface characteristics can be used; however, typical characteristics of aerogels include surface areas greater than about 100 meters squared/gm, and pore radii greater than about 1-10 nm.

Metal Complexes and Formation of a Multi-Metallic Compound

As mentioned earlier, at least two different metal complexes can be utilized to form a multi-metallic compound on the surface of the substrate. A first pretarget metal complex can be reacted with the substrate to form a target metal species. This target metal species can be optionally oxidized to form a target for a second metal complex. This oxidization step can allow for selection of a pretarget metal complex and a secondary metal complex such that a redox reaction occurs between the two species. In this case, the secondary metal complex can act as the reducing agent. However, either of the target and secondary metal complexes can be chosen as the oxidizing agent. For example, the first target metal species can also be reduced and the secondary metal complex chosen to act as an oxidizing agent. Alternatively, some metal complexes can act as a reducing or oxidizing agent directly without a separate step of oxidation or reduction.

Various metal-containing species are considered useful for the present invention. A wide variety of materials can be used which satisfy the criteria of reacting in a redox reaction to form a multi-metallic species. In one aspect, the metal-containing species can be gaseous. Alternatively, the metal-containing species can be provided in a liquid form, i.e. for non-aerogel embodiments. Several non-limiting examples of suitable metal-containing species can include metal complexes having pentadienyl ligands, such as 2,4-dimethylpentadienyl, 6,6-dimethylcyclohexadienyl, 3-methylpentadienyl, and other dienyl ligands, allyl ligands, cyclopentadienyl ligands such as aromatic cyclopentadienyl, aromatic pentamethylcyclopentadienyl, cyclooctenyl, cyclooctadiene, cyclooctadienyl, hexamethylbenzene, acetate, other coordination complexes such as acetyl acetonate (acac), halides, nitrogen bound species, heteroatom species, fused rings of two to about six rings, and combinations or derivatives thereof. Generally, a wide variety of ligands can be used which have sufficient activity to deliver the metal to the substrate or target metal species. In addition, the ligands can include various substituents such as, but not limited to, C1 to C20 alkyls which are straight chained or branched, silyls, aromatic compounds, aryl compounds, and derivatives or substituted members thereof. Under some conditions, metal-containing species referred to as 19 electron configuration species such as cobaltocene have shown particularly good results in connection with the present invention.

Examples of suitable oxidizing agents which can be obtained from various metal-containing species include, but are not limited to, osmium tetraoxide, ruthenium tetraoxide, ferrocinium, or other metal oxides or complexes which will undergo reduction by the chosen reducing agent. Examples of suitable metal-containing species which can serve as reducing agents include cobaltocene, open cobaltocene, 19 electron iron cyclopentadienyl complexes, iron methylcyclopentadienyl complexes, ruthenium dimethylpentadienyl complexes, other 19 electron organometallic compounds, organometallic or coordination complexes which are good reducing agents. Clearly, certain metal-containing species can act as a reducing agent or as an oxidizing agent, depending on the corresponding species. For example, osmium and ruthenium tetraoxides are strong oxidizing agents which can be suitable for oxidizing a number of metals and metal oxides.

In an additional aspect of the present invention, the metal of the metal-containing species can be any metal which can be incorporated into such species and is useful for a final intended application. Non-limiting examples of metals which can be used include Fe, Co, Ru, Ti, V, Cr, Zr, Os, Pt, Pd, Ag, Ni, Mo, W, oxides or alloys thereof, or any other catalytically active metal. In one aspect, the metal can include Fe, Co, Ru, or combinations thereof. For example, Fe, Co, and Ru, gaseous metal-containing species are readily available. Similarly, analogous volatile sources are available for Ti, V, Cr, Fe, Zr, Os, and other metals. Strong and immediate catalyst metal-support interactions allow for effective incorporation of catalyst, with the potential for more efficient catalyst dispersal over the surface. Further, there is an increased degree of contact between the two metals rather than large areas of a single metal. The resulting increased exposure reactants to multiple metals during a reaction can lead to higher reactivities. Without being bound to a particular theory, it is thought that such improved reactivities are the result of the combined action of each type of metal in supporting specific reactive intermediates.

Metal complexes which are suitable for use in the present invention can include a wide variety of metal complexes. In one embodiment, at least one of the pretarget metal complex and secondary metal complex can have the general formula $$M\text{-}L_n \qquad \text{Equation 1}$$

where M is a transition, actinide, lanthanide, or main group metal and $L_n$ are n complexing ligands. Although M can be any catalytically active metal, transition metals tend to provide exceptional catalytic activity. In one embodiment, currently preferred metals include Fe, Co, Ru, and Ce. Further, L can be any suitable ligand. Suitable ligands can provide a single coordination point (e.g. Equations 4-6 below) or multiple coordination points (e.g. Equation 6). As a general guideline, n can vary from 1 to about 5, although 1 to 3 is most typical. Each of $L_1$ through $L_n$ can be independently selected from suitable ligands and can be the same or different. Suitable ligands can include any dienyl ligands, allyl ligands, cyclic rings containing from six to eight members in the ring, or other similar complexing ligands. Specific, non-limiting examples of suitable ligands can include 2,4-dimethylpentadienyl, cyclooctenyl, aromatic cyclopentadienyl, hexamethylbenzene, cyclohexadienyl, cyclooctadienyl, cycloheptadienyl, acetate, halides, acac, aromatic, aryl, fused rings, and derivatives or substituted compounds thereof.

Metal complexes containing a pentadienyl ligand can also be particularly suitable for use in the present invention. In some embodiments, at least one of the pretarget metal complex and secondary metal complex can have the formula Equation 2

Additionally, the cobalt complex shown below in Equation 3 functions well as a cobalt source, readily giving at least up to about 10 wt % incorporation, with the expulsion of cyclooctene.

Equation 3

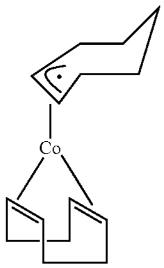

Similarly, other suitable metal complexes can include $Fe(C_5H_5)(2,4\text{-}C_7H_{11})$, ferrocene, cobaltocene, ruthenocene, cerium alkoxides (e.g. cerium acac), metallocenes, open metallocenes, and the metal complexes shown in Equations 4, 5 and 6 and can also be used in connection with the present invention.

Equation 4

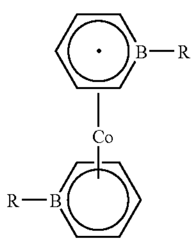

where R is a C1 to C20 alkyl, typically C1 to about C5. Further, R can be branched, aromatic, and/or substituted.

Equation 5 where AL is an aromatic ligand such as hexamethylbenzene or a fused ring compound having two to about seven fused rings and M can be a suitable catalyst metal such as ruthenium or another of the previously listed metals. Currently, fused ring ligands are preferred as they tend to be more stable. For example, in one embodiment, AL can be a polycyclic arene or a fused ring ligand having from two to six fused six member rings (and preferably three to six fused rings) which can be heteroatom or carbon rings and can include a variety of optional substituents.

Equation 6

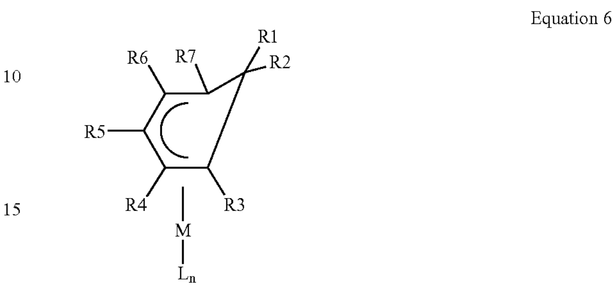

where R1 through R7 can be hydrogen, methyl, $Me_3Si$, C2 to C6 alkyl, aryl, or other suitable pendant groups.

Once the target and secondary metal complexes have been reacted, any non-oxidized metal can be oxidized sufficient to remove substantially all organic portions of the target and secondary complexes to form a multi-metallic oxide compound. Oxidation can be performed by heating in an oxygen environment. Additionally, in some embodiments it can be desirable to reduce the multi-metallic oxide compound to their respective base metal having an oxidation state of zero. Reduction can be performed, for example, by heating under a hydrogen stream. This can be readily done in situ in a reactor immediately prior to use, although reduction can be performed at any time. As a result, the final activated catalyst is a multi-metallic compound having improved catalytic activity.

In another alternative aspect of the present invention, additional metal complexes can be reacted with the multi-metallic compound or multi-metallic oxide. In this way, the thickness of the multi-metallic coating can be increased. Further, as additional metal-containing species are reacted a greater number of reactive sites become available for incorporation of additional metal-containing species. Thus, the relative content of co-catalysts can be carefully controlled to achieve a desired ratio. This can help to optimize catalytic activity, cost, and stability depending on the desired application.

A number of additional materials can be suitable for use in connection with the present invention. For example, the $Co(C_8H_{12})(C_8H_{13})$ complex can be useful in comparing F-T reactivities for gas phase incorporated Co and reactivities displayed by solution phase incorporated Co. Given the enhanced reactivity of the above-described 2 wt % Ru/2 wt % Co catalyst, derived from a ruthenium pentadienyl complex and cobaltocene, similar combinations of metal-containing species can be considered. Additionally, incorporation of metal can be controlled to adjust metal loading for a specific application, e.g., 2, 6, and 10 wt % can be easily formed. Additionally, catalyst activity can also be seen in some of the above-described embodiments at various stages of incorporation. For example, prior to oxidation, or prior to reduction to the base metal, a multi-metallic coating can exhibit catalytic activity sufficient for use in many commercial applications. Thus, the multi-metallic compound formed by the oxidation-reduction reaction can be treated merely by cleaning or by further oxidation or reduction.

Further, additional materials can be added in order to produce a specific commercial product. For example, promoter or inhibitors can be added to carefully tailor catalytic activity, selectivity, stability, and/or lifetime of the catalyst material. Non-limiting examples of potentially suitable promoters include alumina, calcium oxide, potassium oxide, chlorides, sulfides, and the like. Similarly, a suitable inhibitor can include, but is in no way limited to, halogenated compounds. The selection of specific additives will depend on the catalyst material and the intended application and can be designed by those skilled in the art of catalysis and reaction engineering based on the teachings herein described.

The methods of the present invention can be used to produce a variety of useful materials such as multi-metallic coated substrates. Multi-metallic coated substrates can be used as catalytic materials, deposition substrates, nano-material manufacture templates, semiconductors, metal chalcogenides, or the like. Typically, the multi-metallic coated substrates can include a porous substrate having a multi-metallic coating on at least a portion thereof. The multi-metallic coating can include a first metal and a second metal associated with the porous substrate.

In one alternative aspect of the present invention, the first metal and second metal form an alloy. In some embodiments, the multi-metallic coating can be conductive. Many commercial embodiments of the present invention can require certain minimum coating thicknesses and/or metal content. For example, in one aspect of the present invention, the multi-metallic coating can be less than about 1 mm in thickness, and in some embodiments can be less than about 100 μm, and in other embodiments can be less than about 20 nm. Similarly, as a general guideline, the multi-metallic coating can comprise from about 2 wt % to about 50 wt % of the multi-metallic coated substrate. Especially in the case of producing a catalytic material, the multi-metallic coating can comprise from about 15 wt % to about 40 wt % of the multi-metallic coated substrate.

In accordance with the principles of the present invention, increased metal loadings can be achieved over conventional processes. For example, in some cases the metal can comprise from about 10 wt % to over about 50 wt %, although loadings outside this range can also be useful in some applications. Additionally, single site metal catalysts can be achievable, which are becoming of great interest for other processes. See C. Nozaki, C. G. Lugmair, A. T. Bell, and T. D. Tilley, J. Am. Chem. Soc. 2002, 124, 13194; A. T. Bell Science 2003, 299, 1690; and K. Mori, Y. Hara, T. Mizugaki, K. Ebitani, and K. Kaneda J. Am. Chem. Soc. 2003, 125, 11460, which are each incorporated herein by reference.

EXAMPLES

The following examples illustrate various methods of making aerogel supported multi-metallic catalysts in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

Preparation of Multi-metallic Coated Substrates

The following illustrates an exemplary embodiment of the present invention. Metallocenes, open metallocenes, and $Fe(C_5H_5)(2,4\text{-}C_7H_{11})$ were prepared by published procedures. See "Organometallic Synthesis," Vol. 1, p. 64, R. B. King, Ed., Academic Press (1965); D. R. Wilson, L. Stahl, and R. D. Ernst Organomet. Synth. 1986, 3, 136; and Ch. Elschenbroich, E. Bilger, R. D. Ernst, D. R. Wilson, and M. S. Kralik, Organometallics 1985, 4, 2068, each of which are incorporated herein by reference. Prior to the incorporation of metal complexes, the aerogels were heated to 150° C. and maintained under vacuum at that temperature for 2 hours. These aerogels were then stored in a glovebox until needed.

Deposition of these metal complexes into monolithic aerogels was carried out under static vacuum. The respective organometallic compound and the aerogel were prevented from physical contact using a wire screen. For deposition into powdered samples for spectroscopic or catalytic studies, a finely powdered aerogel was placed together with the appropriate compound into a Schlenk tube, which was then evacuated and rotated continuously for several hours to ensure uniform incorporation.

These materials were then studied using a variety of methods to determine relevant properties. For example, solid state NMR, XAFS/XANES, TEM, and Mössbauer studies, as well as ESR and magnetic measurements were carried to characterize the multi-metallic porous substrates. Additionally, several substrates were tested under F-T reaction studies under gas phase and supercritical conditions.

A simplified depiction of the incorporation process is provided below:

Equation 7

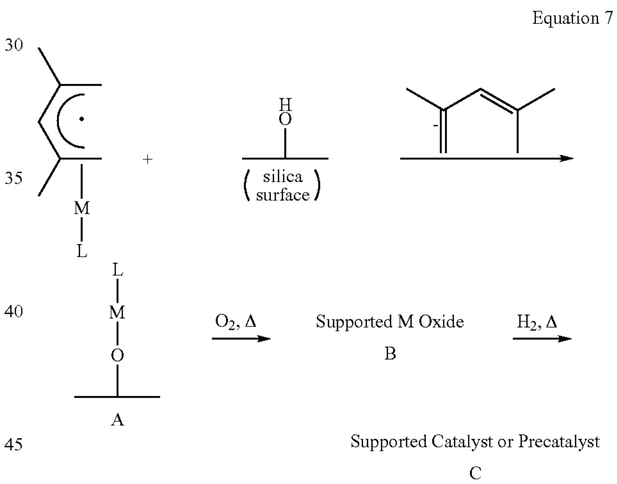

In equation 7, M can be Fe or Ru and L may be either a second 2,4-dimethylpentadienyl ligand ($2,4\text{-}C_7H_{11}$), a less reactive, aromatic cyclopentadienyl ligand ($C_5H_5$), or almost any of the above recited L ligands. It should be noted that similar Co analogues can also be used. Experimental results confirm the expected diene has been detected with A.

The metal species can be attached to the aerogel surface using a variety of mechanisms. The extent of association for the species A through C (as well as the catalyst after actual use) is increased, and the metal centers of these species can be present in a single environment or in a variety of environments. For example, the co-catalyst metals can be intimately mixed or segregated into adjacent domains. In either case, the relative association of co-catalysts is significantly increased over conventional catalyst materials.

Typically, species A will be diamagnetic, and is generally situated randomly. The exceptionally high air-sensitivity of these typically pyrophoric species, however, is unlike any related molecular complex, reflecting the uniqueness of the metal-support interaction in the present invention. This sensitivity interferes with obtaining good NMR and XAFS data. Thus, it can be desirable to use equipment which allows for reliable measurement of air-sensitive materials. Additionally, the use of a species L such as a bulky $C_5Me_5$ ligand leads to a much less sensitive product which decreases problems with property measurement.

In the case of ruthenium, species C has proven to yield an active catalyst whose TEM images reveal the presence of agglomerated particles, which at ca. 2 wt % loadings appear as small, uniform clusters, but at ca. 10 wt % loadings appear as mixtures of these small clusters and much larger needles. The results also indicate a nearly uniform distribution of the metal particles throughout the aerogel (i.e., there is no surface segregation as may be observed with traditional supports).

As noted above, a volatile cyclooctadienyl cobalt complex can also be used. Other metal-containing species such as cobaltocene (the 19 electron analogue of ferrocene) can also be used. Similarly, the 18 electron ferrocene and ruthenocene species can be incorporated into aerogels, to an extent of ca. 6 wt %. As no chemical reaction occurs initially, the incorporation is reversible; however, after several days the ferrocene samples begin taking on a greenish color, apparently due to the formation of the blue, 17 electron $Fe(C_5H_5)_2$ cation. This demonstrates a remarkable enhancement of the reactivity of ferrocene, which can be used in preparing mixed metal domains in accordance with the present invention.

Additionally, due to its unfavorable 19 electron count, cobaltocene is a strong reducing agent and is thus typically incorporated irreversibly. While ferrocene and ruthenocene incorporate randomly throughout an aerogel, and the pentadienyl compounds incorporate selectively on the monolith surface with high reactivity, an intermediate level of reactivity and surface selectivity is observed for cobaltocene. Quite unexpectedly, however, incorporation is accompanied by expulsion of $C_5H_8$ (cyclopentene), revealing the pickup of three hydrogen atoms by one of the $C_5H_5$ ligands. Subsequent oxidation of this phase leads to a bluish aerogel. Magnetic measurements reveal it is paramagnetic, but the lack of any significant ESR signal suggests the presence of Co/Co interactions.

Redox Targeting Approach to Ruthenium Multi-Metallic Domains

As the reactivities of Co F-T catalysts can be substantially enhanced by addition of relatively small Ru contents, it can be desirable to provide gas phase approaches to such mixed metal catalysts. The fact that the 19 electron cobaltocene can reduce oxides of Fe, Co, and Ru to the metals provides a route to these species, with the increased degrees of intimacy. An illustration of this approach is provided below in Equation 7.

Equation 7

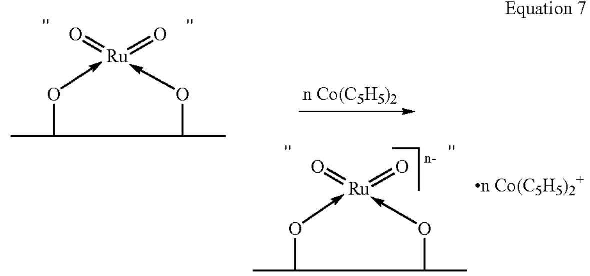

The cobalt to ruthenium ratio can be varied in order to control metal content and/or catalytic activity. Subsequent oxidation can then lead to small mixed metal oxide domains, which were studied through the methods applied above for species B and C in Equation 6. These oxides can then be either reduced to their respective base metals as catalysts for study, or exposed to additional cobaltocene which would then target both the ruthenium and cobalt oxides. With additional cobalt incorporation cycles, progressively greater amounts can be added each time. An interesting variation of this approach involves the use of the $Co(C_8H_{12})(C_8H_{13})$ complex. This cobalt complex can be incorporated into the aerogels much more readily than cobaltocene thus offering increased catalytic activity. Further, the 19 electron ruthenium complexes, $Ru(C_5R_5)$(arene), where R can be hydrogen, alkyl, aryl or the like and arene can include arenas such as, but not limited to, $C_6Me_6$, are even more powerful reducing agents than cobaltocene. Hence, one can selectively deliver ruthenium to cobalt (or other metal) oxide sites, giving an advantageous combination. Alternatively, iron containing species can also be utilized to make mixed metal domains.

F-T Reactivity of Gas Phase Impregnated Aerogels

Indeed, the first sample of an Ru impregnated aerogel (10 wt % Ru) was so active that a diluted flow stream was required to allow for study. A significantly higher conversion rate was observed relative to analogous Co catalysts prepared by aqueous impregnation. Generally, Ru catalysts are expected to show higher activities than Co. This effect can also be true when comparing the activity of the Ru catalyst formed from gas phase deposition with one formed via conventional solution methods. Samples with 2 and 6 wt % Ru incorporation were also examined, and as expected showed lower activities. A substantial fraction of the resulting hydrocarbons did involve diesel range species. Although pure ruthenium catalysts would often be too expensive for commercial applications, for possible emergency (e.g., military) applications, in which time is a priority, Ru can provide a cost effective alternative, and would likely be the catalyst of choice.

A modest incorporation (ca. 2%) of cobalt using cobaltocene was also used to study the gas phase-derived cobalt aerogel catalyst for F-T activity. An oxidized 2% Ru aerogel and incorporated 2% cobalt (not quite a 2:1 atom ratio) was also formed. This catalyst is far more reactive than either 2% Co or Ru; and was approximately 80% as active as the 10% ruthenium catalyst.

Generally, metal pentadienyl complexes can be very effective for the incorporation of Fe and Ru into aerogels; furthermore, high catalytic activities have been obtained in some cases. Further, metallocene sources can be effective for simple incorporation. However, the strong reducing nature of cobaltocene allows for a redox-targeting approach for directing the incorporation of a second metal to an existing metal oxide in the support.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of incorporating metals on a substrate, comprising the steps of:

a) reacting a pretarget metal complex with an active group on a substrate to form a target metal species, said target metal species capable of reacting with a secondary metal complex in an oxidation-reduction reaction; and b) reacting the secondary metal complex with the target metal species in an oxidation-reduction reaction to form a multi-metallic compound on the substrate;

wherein at least one of the pretarget metal complex and secondary metal complex have the formula $$M\text{-}L_n$$

where M is a transition, actinide, lanthanide, or main group metal, L is a complexing ligand, and n is from one to five.

2. The method of claim 1, further comprising the step of oxidizing the target metal species to form an oxidized target metal on the substrate prior to the step of reacting the secondary metal complex, said secondary metal complex acting as a reducing agent.

3. The method of claim 1, further comprising the step of reducing the target metal species to form a reduced target metal on the substrate prior to the step of reacting the secondary metal complex, said secondary metal complex acting as an oxidizing agent.

4. The method of claim 1, wherein the substrate comprises a member selected from the group consisting of aerogel, xerogel, zeolite, silica, alumina, silica gel, and composites or combinations thereof.

5. The method of claim 4, wherein the substrate comprises an aerogel.

6. The method of claim 1, wherein M is Fe, Co, Ru, or Ce and L is a dienyl compound.

7. The method of claim 1, wherein the active group is hydroxyl.

8. The method of claim 1, further comprising the step of oxidizing said multi-metallic compound to remove organic portions of said multi-metallic compound and to form a multi-metallic oxide compound.

9. The method of claim 8, further comprising reducing the multi-metallic oxide compound to form a multi-metallic metal having an oxidation state of zero.

10. The method of claim 1, further comprising the step of reacting additional metal-containing species with the multi-metallic compound.

11. A method of incorporating metals on a substrate, comprising the steps of:

a) reacting a pretarget metal complex with an active group on a substrate to form a target metal species, said target metal species capable of reacting with a secondary metal complex in an oxidation-reduction reaction; and b) reacting the secondary metal complex with the target metal species in an oxidation-reduction reaction to form a multi-metallic compound on the substrate;

wherein the pretarget metal complex and secondary metal complex are independently selected from the group consisting of metallocenes, open metallocenes, and combinations or derivatives thereof.

12. The method of claim 11, further comprising the step of oxidizing the target metal species to form an oxidized target metal on the substrate prior to the step of reacting the secondary metal complex, said secondary metal complex acting as a reducing agent.

13. The method of claim 11, further comprising the step of reducing the target metal species to form a reduced target metal on the substrate prior to the step of reacting the secondary metal complex, said secondary metal complex acting as an oxidizing agent.

14. The method of claim 11, wherein the substrate comprises a member selected from the group consisting of aerogel, xerogel, zeolite, silica, alumina, silica gel, and composites or combinations thereof.

15. The method of claim 14, wherein the substrate comprises an aerogel.

16. The method of claim 11, wherein the active group is hydroxyl.

17. The method of claim 11, further comprising the step of oxidizing said multi-metallic compound to remove organic portions of said multi-metallic compound and to form a multi-metallic oxide compound.

18. The method of claim 17, further comprising reducing the multi-metallic oxide compound to form a multi-metallic metal having an oxidation state of zero.

19. The method of claim 11, further comprising the step of reacting additional metal-containing species with the multi-metallic compound.

20. A method of incorporating metals on a substrate, comprising the steps of:

a) reacting a pretarget metal complex with an active group on a substrate to form a target metal species, said target metal species capable of reacting with a secondary metal complex in an oxidation-reduction reaction; and b) reacting the secondary metal complex with the target metal species in an oxidation-reduction reaction to form a multi-metallic compound on the substrate;

wherein at least one of the pretarget metal complex and secondary metal complex are independently selected from the group consisting of $Fe(C_5H_5)(2,4\text{-}C_7H_{11})$, ferrocene, cobaltocene, ruthenocene, cerium alkoxides,

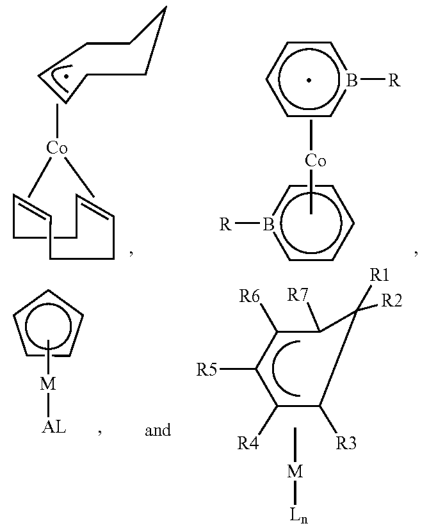

where R is a C1 to C20 alkyl, R1 through R7 can be independently hydrogen, methyl, $Me_3Si$, C2 to C6 alkyl, or aryl, M is a transition, actinide, lanthanide, or main group metal, L is a complexing ligand, AL is an aromatic complexing ligand, and n is from one to five.

21. The method of claim 20, further comprising the step of oxidizing the target metal species to form an oxidized target metal on the substrate prior to the step of reacting the secondary metal complex, said secondary metal complex acting as a reducing agent.

22. The method of claim 20, further comprising the step of reducing the target metal species to form a reduced target metal on the substrate prior to the step of reacting the secondary metal complex, said secondary metal complex acting as an oxidizing agent.

23. The method of claim 20, wherein the substrate comprises a member selected from the group consisting of aerogel, xerogel, zeolite, silica, alumina, silica gel, and composites or combinations thereof.

24. The method of claim 23, wherein the substrate comprises an aerogel.

25. The method of claim 20, wherein M is Fe, Co, Ru, or Ce and L is a dienyl compound.

26. The method of claim 20, wherein the active group is hydroxyl.

27. The method of claim 20, further comprising the step of oxidizing said multi-metallic compound to remove organic portions of said multi-metallic compound and to form a multi-metallic oxide compound.

28. The method of claim 27, further comprising reducing the multi-metallic oxide compound to form a multi-metallic metal having an oxidation state of zero.

29. The method of claim 28, further comprising the step of reacting additional metal-containing species with the multi-metallic compound.

* * * * *